F. LAIBLE.
VEHICLE CURTAIN FASTENER.
APPLICATION FILED APR. 24, 1915.

1,157,312.

Patented Oct. 19, 1915.

WITNESSES:

INVENTOR.
Frank Laible
BY
ATTORNEY.

UNITED STATES PATENT OFFICE.

FRANK LAIBLE, OF AUGUSTA, KENTUCKY, ASSIGNOR TO THE F. A. NEIDER COMPANY, OF AUGUSTA, KENTUCKY, A CORPORATION OF KENTUCKY.

VEHICLE CURTAIN-FASTENER.

1,157,312.   Specification of Letters Patent.   Patented Oct. 19, 1915.

Application filed April 24, 1915. Serial No. 23,736.

*To all whom it may concern:*

Be it known that I, FRANK LAIBLE, a citizen of the United States of America, and resident of Augusta, county of Bracken, State of Kentucky, have invented certain new and useful Improvements in Vehicle Curtain-Fasteners, of which the following is a specification.

This invention relates to improvements in vehicle curtain fasteners.

An object of my invention is to produce an improved curtain fastener which is cheaper to manufacture and which contains less metal than other vehicle curtain fasteners known to me without sacrificing any of the strength of the other fastener constructions.

Figure 1:
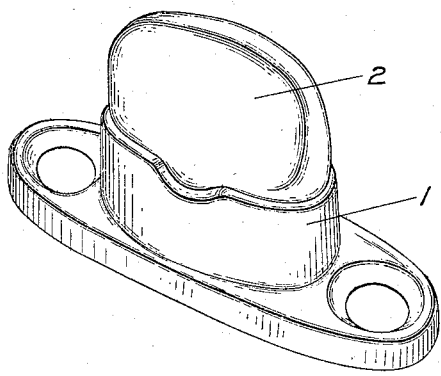
Figure 2:
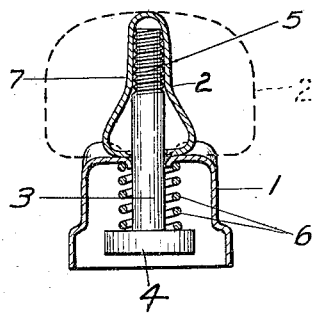

Figure 1 is a perspective view of a vehicle curtain fastener embodying my invention. Fig. 2 is a transverse sectional view thereof.

Heretofore in manufacturing carriage curtain fasteners with hollow heads the head portion has been provided with integrally formed tongues extending from each side, which were brought together to form the pivot pin upon which the head of the fastener was turned on its mounting base when securing a carriage curtain in place. In addition to this, carriage curtain fasteners have been manufactured with solid heads in which a centrally disposed bore was located to receive the pivot pin of the fastener. In order to secure the head of the first described construction, the tongues were bent outwardly to support a spring located between the bent ends of the tongues and the under side of the base, and in the second described construction the solid head was mashed to bring the metal thereof into engagement with screw threads formed on the pivot pin provided for securing the head to the base. In the first described construction the formation of the head with its integrally attached tongues was a more or less expensive formation in that it necessitated wasting some of the metal of the sheet from which the head is formed. In the second construction the formation of the head was expensive since to form the head of solid metal necessitated the employment of more metal than were a head of hollow construction to be provided. In addition to the expense incurred by the necessary employment of an increased amount of metal, the operations of forging the head and drilling it were expensive ones. It is for the purpose of overcoming the above enumerated objections of ordinary fastener constructions, that I have devised the improved head of the fastener construction set forth in the following specification and illustrated in the drawings.

The fastener consists of a base, a pivot pin mounted in the base, and a head secured to the pivot pin. The base has the usual raised boss 1. The head 2 is formed from a piece of sheet metal, which is swaged to form a seamless hollow dome. The pivot pin 3 has a head 4 at one of its ends and screw threads 5 at the other end and projects upward through boss 1, and between its head 4 and the top of the boss is a coiled spring 6. Head 2 is secured to the pivot pin by having its sides 7 compressed into the screw threads thereof.

Having thus described my invention, what I claim is:

1. A vehicle curtain fastener comprising a base, a hollow seamless head mounted on the base, and a pin pivotally mounted in the base and secured to the head by compression of the sides of the head into engagement with the pin.

2. A vehicle curtain fastener comprising a base, a pin pivotally mounted at one of its ends in the base, a hollow seamless head having an imperforate top and being secured to the other end of the pin by having its sides compressed into engagement therewith.

3. A vehicle curtain fastener comprising a base, a pin pivotally mounted at one of its ends in the base and having its opposite end externally screw-threaded, and a hollow seamless head having its sides compressed into engagement with the screw-threaded end of the pin.

In testimony whereof, I have hereunto subscribed my name this 20th day of April, 1915.

FRANK LAIBLE.

Witnesses:
 EDWIN C. TOLEMAN,
 JOE H. FEDERER.

Copies of this patent may be obtained for five cents each, by addressing the "Commissioner of Patents, Washington, D. C."